W. L. PATTERSON.
SCENE SHIFTING DEVICE FOR PROJECTION APPARATUS.
APPLICATION FILED AUG. 1, 1913.
1,226,806.
Patented May 22, 1917.
2 SHEETS—SHEET 1.
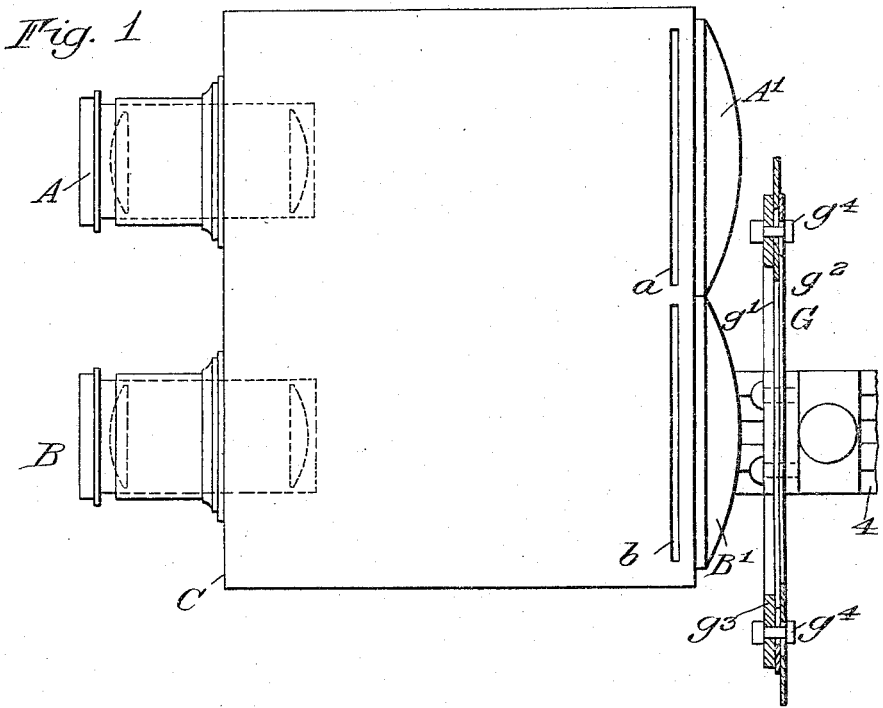
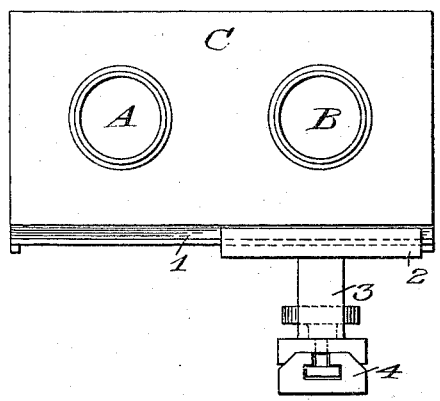
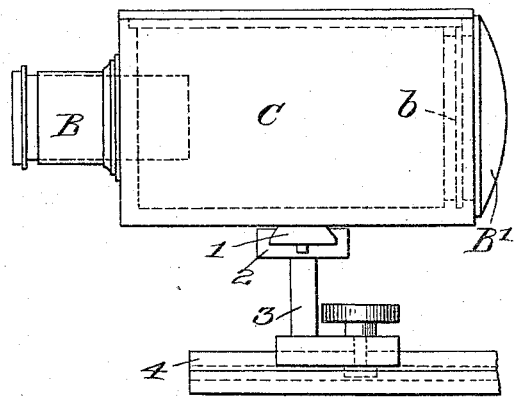
Witnesses
Walter B. Payne
Nelson H. Copp
Inventor
William L. Patterson
By
his Attorneys

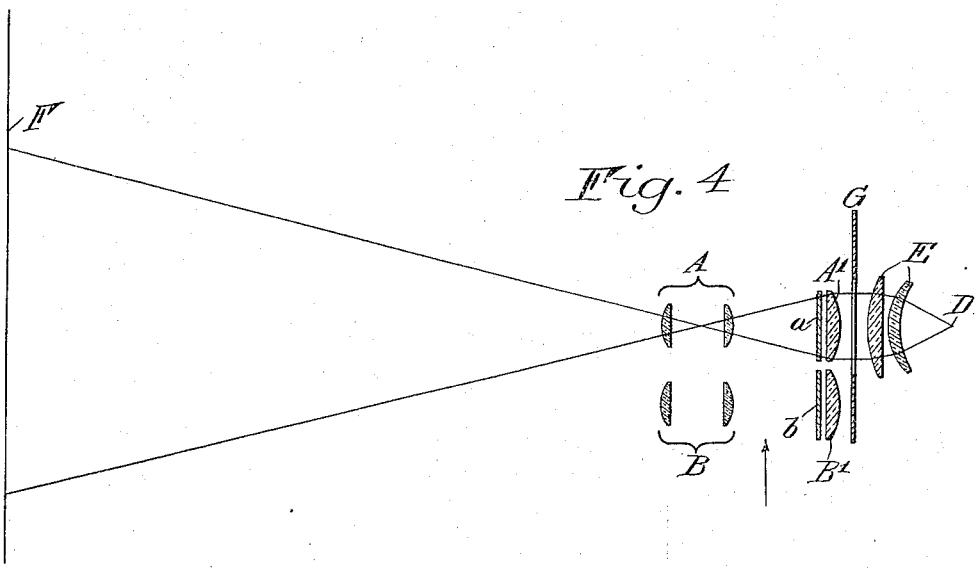
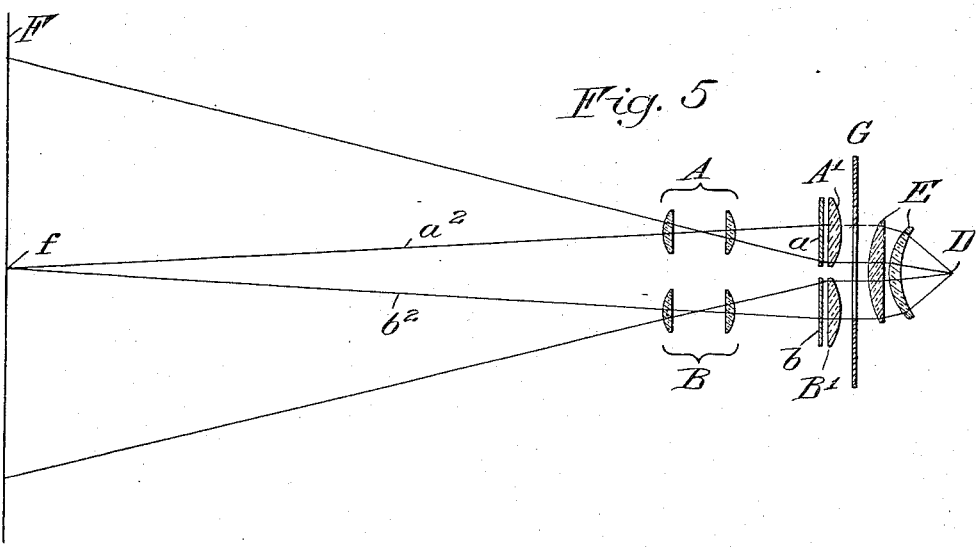

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

SCENE-SHIFTING DEVICE FOR PROJECTION APPARATUS.

1,226,806.  Specification of Letters Patent.  Patented May 22, 1917.

Application filed August 1, 1913. Serial No. 782,400.

*To all whom it may concern:*

Be it known that I, WILLIAM L. PATTERSON, of Rochester, in the county of Monroe, in the State of New York, have invented certain new and useful Improvements in Scene-Shifting Devices for Projection Apparatus; and I do hereby declare the following to be a full, clear, and exact description of the same, reference being had to the accompanying drawings, forming a part of this specification, and to the reference-numerals marked thereon.

My present invention relates to the projection apparatus and has for its object to provide means for shifting or changing the scene, whereby one projected image may be caused to displace another on the screen in such a manner that no apparent movement of the two images occurs, the substitution of one image for the other producing the apparent effect of one picture being applied by being wiped across the screen as the edge of the other picture is taken up or disappears. In other words the meeting edges of the advancing and receding views respectively move onto and off from the screen within a zone marked by the meeting rays of two parallel systems of lenses, said zone or point traveling across the screen in one direction or another as the angle of the light rays through the lenses varies by reason of the shifting of either the lenses relative to the light source or the moving of the light source out of axial alinement with one lens system into alinement with the other. To these and other ends my invention consists in certain improvements and combinations of parts all as will be hereinafter more fully described the novel features being pointed out in claims at the end of this specification.

In the drawings:

Figure 1 is a top plan view of an apparatus constructed in accordance with my invention illustrating one embodiment thereof;

Figs. 2 and 3 are front and side elevations respectively, and

Figs. 4 and 5 are diagrammatic illustrations showing the device in different positions of adjustment, and the path of the light rays.

Similar reference numerals in the several figures indicate similar parts.

My invention comprehends a device for use in connection with picture projection apparatus which is adapted to be employed for changing the images of pictures projected on the focusing screen, in a manner pleasing to the observer's eye and it differs from the so-called dissolving view mechanism in that instead of the image of the first picture gradually dissolving, or fading away, as the intensity of the second picture increases, it permits the simultaneous showing of images of two pictures with equal clearness, or intensity of illumination. In the operation of the device the image of the second picture appears to advance across the screen and in effect creates the impression as if it were sliding over and being superposed upon the image of the first picture. Optically considered the advancing edge of the image of the second picture is laid on the screen by light rays admitted through one lens system as the adjacent edge of the image of the first picture is removed by the cutting off of the light rays passing through the other lens system; the line of demarcation between the two images being rather well defined and so much of the images of the two pictures as appear upon the screen are correspondingly illuminated.

The apparatus generally described for accomplishing my present invention comprises a plurality of projecting lens systems arranged in juxtaposition and composing one element, together with a source of light which forms the second element of the invention. Said elements are so disposed that one is capable of movement laterally relatively to the other, whereby the pencil of light rays which may fully illuminate one lens system may be caused to enter an adjacent lens system and finally fully illuminate it, the transition of the pencil of light rays from one lens system to the other serving to effect the apparent advance and receding of the meeting edges of the two projected images.

In carrying out my invention I employ a plurality of projecting lens systems, two of such being shown in the present disclosure indicated by A and B. These lens systems are arranged side by side and supported in any convenient mounting such as the box C which may also constitute a holder for the transparencies, or objects of which images are to be projected. In the present illustrations the object holders are indicated by $a$ and $b$ which are adapted to accommodate the usual lantern slides. If desired the lens systems may also comprise the collective lenses A′ and B′ arranged adjacent to and in rear of the object holders and also carried on the mounting C. The separate lens systems with their respective object holders and condensers are secured in their relative positions and together constitute one element of the apparatus. If this element is to be the movable part of the apparatus then the mounting C is supported for adjustment in the plane of the axes of the lens systems, $i.\ e.$ if the lenses are arranged in a horizontal plane they will be capable of movement in either direction horizontally, or if said lenses are disposed one above the other then the mounting in which they are carried will be supported for vertical movement. In the device just described this adjustment is provided by forming on the bottom of box C a guide 1 carried in ways 2, on a standard 3 which is preferably adjustably supported on the bed 4 of the projection apparatus.

The source of illumination indicated by D, Figs. 4 and 5, constitutes the second element of the apparatus and in practice is located in such a position that the pencil of light rays emanating therefrom will illuminate one or the other of the systems of projection lenses when these are in alinement with it, and during their movement transversely will serve to illuminate parts of both lens systems. The light rays are preferably collimated by a condenser E which coöperates at all times with the collective lenses A′ and B′.

In Figs. 4 and 5 I have shown diagrammatically the arrangement of the lens systems, the source of light and the direction of the light rays which fall upon the focusing screen F. The two lens systems A and B are substantially alike so that the same field is covered by the rays projected by each of them and the sizes of the images projected by the lenses are equal; although this is not necessary and is a condition that is desired only because of the more pleasing effect produced in the operation of changing from one scene to another. In the transition which occurs upon the relative movement, or shifting, of one element of the apparatus, with respect to the other, the pencil of light rays enters both of said lens systems with the consequent result that the converging rays of light, as indicated by the lines $a^2$ and $b^2$, cross each other and produce on the screen a zone $f$, which marks the meeting edges of the images of the two pictures. It is in this zone that the new picture seems to be created and the old or previous picture seems to be dissolved. In order to reduce the width of this zone to a narrow line and to eliminate as far as possible the haziness in the images of the two objects at each side of this line, caused by chromatic aberration, I provide a diaphragm G, interposed between the condenser E and the collective lenses A′ and B′, having an aperture the edges of which cut the rays of light entering the projecting lens systems so that the converging rays $a^2$ and $b^2$ will be caused to meet at the surface of the screen F, irrespective of their relative angular relations.

In the operation of the scene shifter let it be assumed that the lenses occupy the position shown in Fig. 4 in which the image of the transparency $a$ is projected onto the screen F by the lens system A. The operator desiring to change the scene inserts the slide or transparency $b$ in its holder and shifts the lens mounting C in the direction indicated by the arrow. During this movement the lenses A are carried out of the path of light as the lenses B are brought into it and when the lenses B have advanced sufficiently to receive part of the light rays the new picture, or image, begins to appear at one edge of the illuminated area of the screen. The new picture continues to grow in size and the previous picture gradually diminishes in area as the two sets of lenses move across the path of the light rays until the image of the object $b$ occupies the entire field of the screen F.

In order to conveniently adapt the apparatus for use under various conditions I make the diaphragm G adjustable, using apertured plates $g'$ and $g^2$ which are adjustably mounted in a support or holder $g^3$ attached to the bed 4. These plates are arranged so that their edges overlap and they may be adjustably secured to the holder by means of bolts $g^4$ which permit them to be moved relatively to determine the size of the aperture and also allow them to be moved together and positioned centrally with respect to the source of illumination and the condenser E.

I claim as my invention:

1. In a scene shifting device for projection apparatus, the combination with a source of parallel light ray illumination, of two separate systems of projection lenses arranged together as a unit, said unit and source of illumination being movable relatively to each other to illuminate one or the other of the separate lens systems, said parts being disposed to illuminate areas of both projection systems during said movement.

2. A scene shifter for projection apparatus comprising two adjacent systems of projecting lenses mounted together, and a source of illumination providing parallel light rays, said lenses and source of illumination being bodily movable relatively transversely to cause the full illumination of one or the other of said lens systems and the partial illumination of both systems during said movement.

3. In a projecting apparatus, the combination with a source of illumination and two systems of projection lenses arranged adjacent one beside the other and capable of being reciprocated laterally of the pencil of rays to alternately position one or the other of said systems in alinement with the source of illumination, said light source being capable of illuminating areas of both lens systems during their shifting movement.

4. In a projection apparatus, the combination with a source of illumination, of two systems of projection lenses arranged side by side and together movable transversely of and in the column of light rays, the diameter of the latter being such that during said movement parts of both lens systems are illuminated.

5. In a projection apparatus, the combination with two systems of lenses arranged side by side, of a source of parallel light rays, said two lenses and said source of light being movable relatively one to the other in a direction transversely to the axes of the lens systems, the latter being so arranged that during their movement complementary parts of each will be illuminated.

6. In a projection apparatus, the combination with two systems of lenses mounted in juxtaposition to each other, of a column of light, said two lens systems and said light source being movable relatively one to the other transversely in the plane of the axes of the two lens systems and a diaphragm for defining the limits of the field illuminated by the light column when complementary parts of the two systems are illuminated.

7. In a projection apparatus, the combination with a source of illumination providing parallel light rays comprising one element, of two projection lens systems mounted in juxtaposition, comprising a second element, one of said elements being shiftable laterally of the axis of the other and a diaphragm arranged between the light source and the lens systems and limiting the area of illumination during the time parts of the two lens systems are illuminated.

8. The combination with two systems of projection lenses connected together and movable in the plane common to their axes, of a source of illumination and a diaphragm arranged to cut the column of light rays and control the width of the zone between the meeting edges of two images projected on a screen when said two lens systems are in a position where the column of light rays passes into both lens systems.

9. The combination with two parallel systems of projection lenses shiftable transversely in the plane common to their axes, of a source of parallel light ray illumination and a stationary diaphragm for defining the area of the column of light rays passing through parts of both lens systems during the time when the latter are moved across the path of said rays.

10. In a projection apparatus, the combination with a source of illumination and a condenser for paralleling the light rays, comprising one element, of a plurality of projection lens systems each embodying an object holder and a collective lens all constituting a second element, one of said elements being movable relatively to the other and a diaphragm interposed between the elements and limiting the area of the light column during the time parts of both lens systems are being illuminated.

11. In a scene shifter for projection apparatus, the combination with a plurality of separate systems of projection lenses mounted side by side, each system comprising a condenser and an object holder in front of each condenser, of a source of parallel light ray illumination, said lens systems and said source of illumination being arranged for relative lateral movement and disposed to cause the light rays to enter said lens systems successively and illuminate parts of the adjacent systems during such movement.

12. In a scene shifter, the combination with a plurality of separate systems of projection lenses, an object holder in rear of each system and condensers in rear of the holders, said lens systems, holders and condensers comprising one element of the structure, of a source of illumination for said lens systems, and a condenser between it and the lens systems, said source of illumination and its condenser comprising the second element of the structure, said first and second elements being capable of relative movement to successively direct the column of light rays into the different systems of projection lenses and during such movement to direct portions of such rays into two adjacent systems of lenses.

13. In a scene shifter for projection apparatus, the combination with an illuminating system, and a projection system comprising two adjacent and substantially parallel projection devices, of means for mounting said systems to permit shifting thereof transversely of the optical axis, said systems being so disposed that complementary areas of the fields of the two projection devices are illuminated during the shifting movement.

14. In a scene shifter for projection apparatus, the combination with an illuminating system, a projection system comprising two adjacent and substantially parallel projection devices, and means for supporting picture devices to be illuminated in the optical axis of each of the projection devices, of means for mounting said systems to permit shifting thereof transversely of the optical axis, said systems being so disposed that complementary areas of the pictures formed by the two projection devices are illuminated during the shifting movement and are substantially equal to the entire area of a picture formed by one of the projection devices.

WILLIAM L. PATTERSON.

Witnesses:
 DANIEL M. SMITH,
 WILLIAM G. WOODWORTH.

Copies of this patent may be obtained for five cents each, by addressing the "Commissioner of Patents, Washington, D. C."